G. W. DUNHAM.
AUTOMOBILE.
APPLICATION FILED DEC. 2, 1910.
1,065,668.
Patented June 24, 1913.
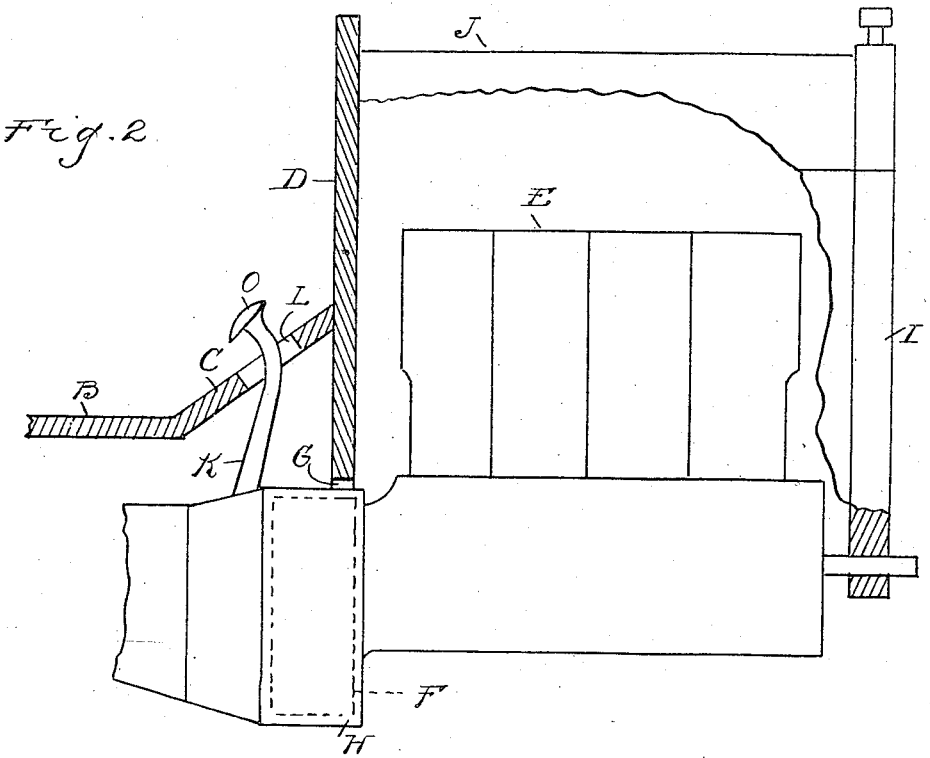
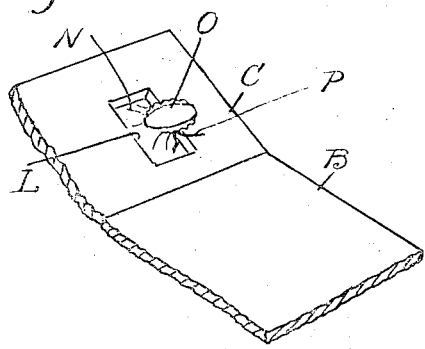
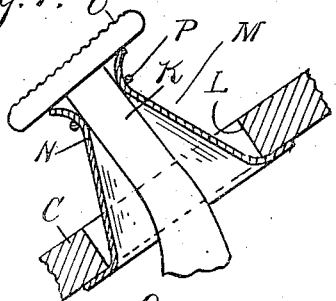

UNITED STATES PATENT OFFICE.

GEORGE W. DUNHAM, OF DETROIT, MICHIGAN, ASSIGNOR TO CHALMERS MOTOR COMPANY, OF DETROIT, MICHIGAN, A CORPORATION OF MICHIGAN.

AUTOMOBILE.

1,065,668.  Specification of Letters Patent.  Patented June 24, 1913.

Application filed December 2, 1910. Serial No. 595,254.

*To all whom it may concern:*

Be it known that I, GEORGE W. DUNHAM, a citizen of the United States of America, residing at Detroit, in the county of Wayne and State of Michigan, have invented certain new and useful Improvements in Automobiles, of which the following is a specification, reference being had therein to the accompanying drawings.

In automobiles of the type known generally as "fore door" construction, wherein the driver's seat is inclosed, the levers and pedals for the control mechanism usually project upwardly through the flooring in position for convenient operation by the driver. As the openings through which the control members extend are to a greater or less extent in communication with the engine chamber, air heated by the motor enters the forward inclosure, which is exceedingly objectionable to the driver.

One of the primary objects of the present invention is to provide a means for obviating this defect, and the invention consists essentially in a closure for the opening or openings of such construction that, while effectively shutting off the passage of heated air through the opening, will at the same time allow of the proper operation of the lever or pedal that extends therethrough.

The invention further consists in the novel construction of the closure, in its application, and in the peculiar arrangement and combination of the various parts; and, further, in certain details of construction, as will be more fully hereinafter described and claimed.

In the drawings,—Figure 1 is a perspective view of the forward section of an automobile of the "fore-door" type; Fig. 2 is an enlarged sectional elevation; and Figs. 3 and 4 are sectional perspective views, illustrating the construction and method of application of the closure.

In the drawings thus briefly described, A represents the forward inclosure of the car, B the flooring, including the footboard C, D the dash, E the engine or motor provided with a fly-wheel F located within an opening G in the dash, H the gear casing, I the radiator, and J the hood forming the inclosing wall of the engine chamber.

The reference-letter K represents an operating member for the control mechanism. In this instance I have shown it as consisting of a foot-pedal extending upwardly through a slot L in the footboard. Its connection with the mechanism that it controls is not herein shown, as the same forms no part of the present invention. To prevent the admission of heat within the forward inclosure through the pedal opening, I provide a closure M which in its preferred form consists of a flexible boot N connected at its opposite ends respectively to the flooring and pedal end. This serves to effectively prevent the passage of air through the opening, and at the same time by its flexibility allows the pedal to be readily moved as may be desired in the operation of the controlling mechanism.

In practice, the tubular closure is fastened along its lower marginal edge to the under side of the footboard about the margin of the slot, while at its upper end it is connected to the pedal beneath the foot section O by a draw-string, as P.

It will be understood that other types of closures may as well be employed, and I do not therefore desire to be limited to the exact construction shown, although I deem the same preferable in use, by reason of its simplicity in construction and ease of application.

What I claim as my invention is.—

In an automobile, the combination with the engine or motor and the inclosing hood or bonnet therefor, of a footboard having a slotted opening therein, a movable foot pedal projecting through the opening in said footboard, and means secured to said footboard and pedal for preventing the passage of gases from the engine hood through said slotted opening to the portion of the vehicle above said footboard in all positions of adjustment of said pedal, comprising an imperforate flexible boot surrounding the pedal connected at one end to the footboard and having the opposite end secured to the pedal.

In testimony whereof I affix my signature in presence of two witnesses.

GEORGE W. DUNHAM.

Witnesses:
JAMES P. BARRY,
ADELAIDE J. ADAMS.